INVENTOR
LeRoy F. Carkhuff

BY Karl W. Flocks
ATTORNEY

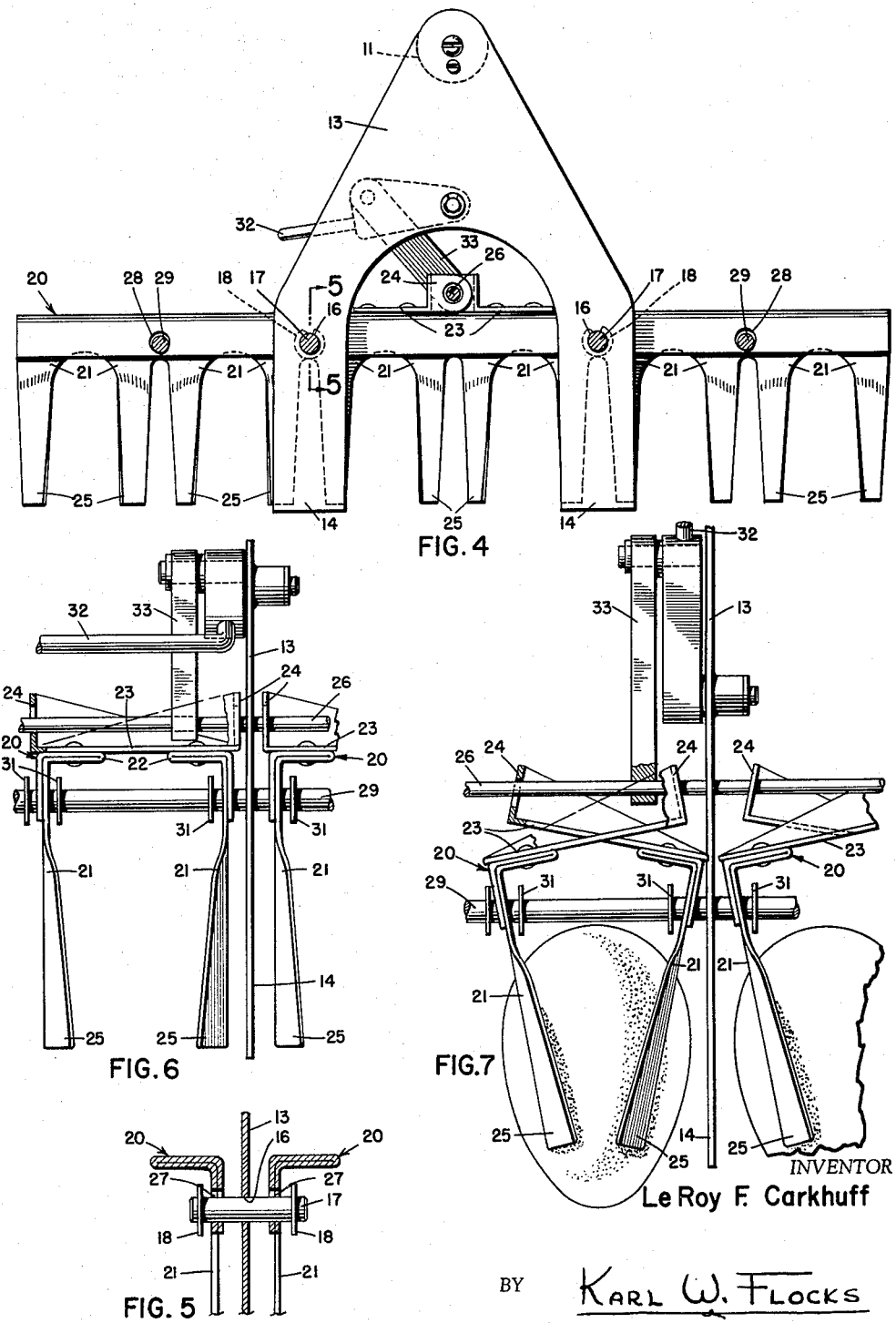

United States Patent Office 2,954,996
Patented Oct. 4, 1960

2,954,996
EGG TRANSFER LIFTER

LeRoy F. Carkhuff, Morris, Ill., assignor to Diamond National Corporation, a corporation of Delaware Filed Nov. 25, 1958, Ser. No. 776,383

6 Claims. (Cl. 294—87)

The present invention relates to an egg transfer lifter, and more particularly to an egg transfer lifter in which actuation of a bail causes pivotal movement of a plurality of spring steel blades to cause engagement of the eggs by four coated spring steel fingers for each egg.

Eggs are customarily packed in egg cases, each case generally having two sections and each section having space for a plurality of layers of eggs. Each layer contains thirty-six eggs, arranged in six rows of six eggs each. To remove these thirty-six eggs from the section of an egg case rapidly, there has been proposed in the past a number of constructions of pick-up devices that are mechanically actuated and that engage thirty-six eggs thus arranged. Although these prior art egg lifters represented a marked advance over the removal of eggs five or six at a time by hand, certain deficiencies have become apparent in their operation. It has been found, for instance, that certain of the prior art egg lifters would not readily pick up and discharge eggs of varying sizes, so that they either cracked extra large eggs or did not securely grasp very small eggs. In other units, the actuating mechanism for the lifter was found to be slow in movement and did not provide for positive and secure egg engagement. Further, some units provided neither a complete and positive release for the eggs, nor an actuating mechanism that was convenient.

Another difficulty that occurred with the egg lifters of the prior art was that their egg-engaging parts often permitted eggs to slip from their grasp. This was due to the fact that eggs are often stored in refrigerated areas, and are taken from these areas into egg rooms for processing, and these egg rooms have a higher temperature than the storage areas. As a result, the moisture in the air of the egg room condenses on the cold eggs, thus making them wet and slippery. When such was the case, prior art egg lifters either failed to provide against an accidental slipping of the eggs out of the gripper, or else attempted to overcome their deficiencies with a tighter grip on the eggs; this was not a satisfactory solution because thin-shelled eggs were often cracked or broken by the too-strong egg grippers.

Other units of the prior art have been constructed in such a manner that they are too heavy, when the weight of the eggs are borne by them, to permit their continued use without unduly tiring the worker handling the lifter.

It is further to be observed that when eggs are packed in egg cases, a formed sheet of molded pulp, known as an egg flat, is used to separate the several layers of eggs. There are two known styles of egg flats in common usage, these styles being distinguished by the depth of the cups that hold the eggs. Prior art egg lifters were unable to engage the eggs when packaged with egg flats other than those for which the lifter was constructed.

It is an object of the present invention to provide an egg transfer lifter that will readily pick up and discharge eggs over a considerable range of sizes.

Another object of the present invention is the provision of an egg transfer lifter that has a compact, quick and positive pick-up mechanism.

A still further object of the present invention is to provide an egg transfer lifter providing a quick release of the eggs, which release is complete, positive and is conveniently actuated.

Yet another object of the present invention is the provision of an egg transfer lifter that will pick up and discharge without damage eggs which are wet, and therefore slippery.

Another object of the present invention is to provide an egg transfer lifter having gripping fingers that will securely hold the eggs without breaking them, even when thin-shelled eggs are being handled.

Yet another object of the present invention is the provision of an egg transfer lifter that is sufficiently light in weight that the use thereof will not tire the ordinary worker.

A still further object of the present invention is to provide an egg transfer lifter that can pick up eggs from both shallow cup and deep cup egg flats with a minimum of change of the lifter.

Other objects and the nature and advantages of the instant invention will be apparent from the following description taken in conjunction with the accompanying drawings, wherein:

Fig. 4 is a cross-sectional view taken on the line 4—4 of Fig. 2.

Fig. 5 is an enlarged cross-sectional view taken on the line 5—5 of Fig. 4.

Fig. 6 is an enlarged, partial end view of the egg lifter of the present invention in the egg releasing position, portions broken away for clarity.

Fig. 7 is a view similar to Fig. 6, but showing the parts in the egg gripping position.

Figure 1:
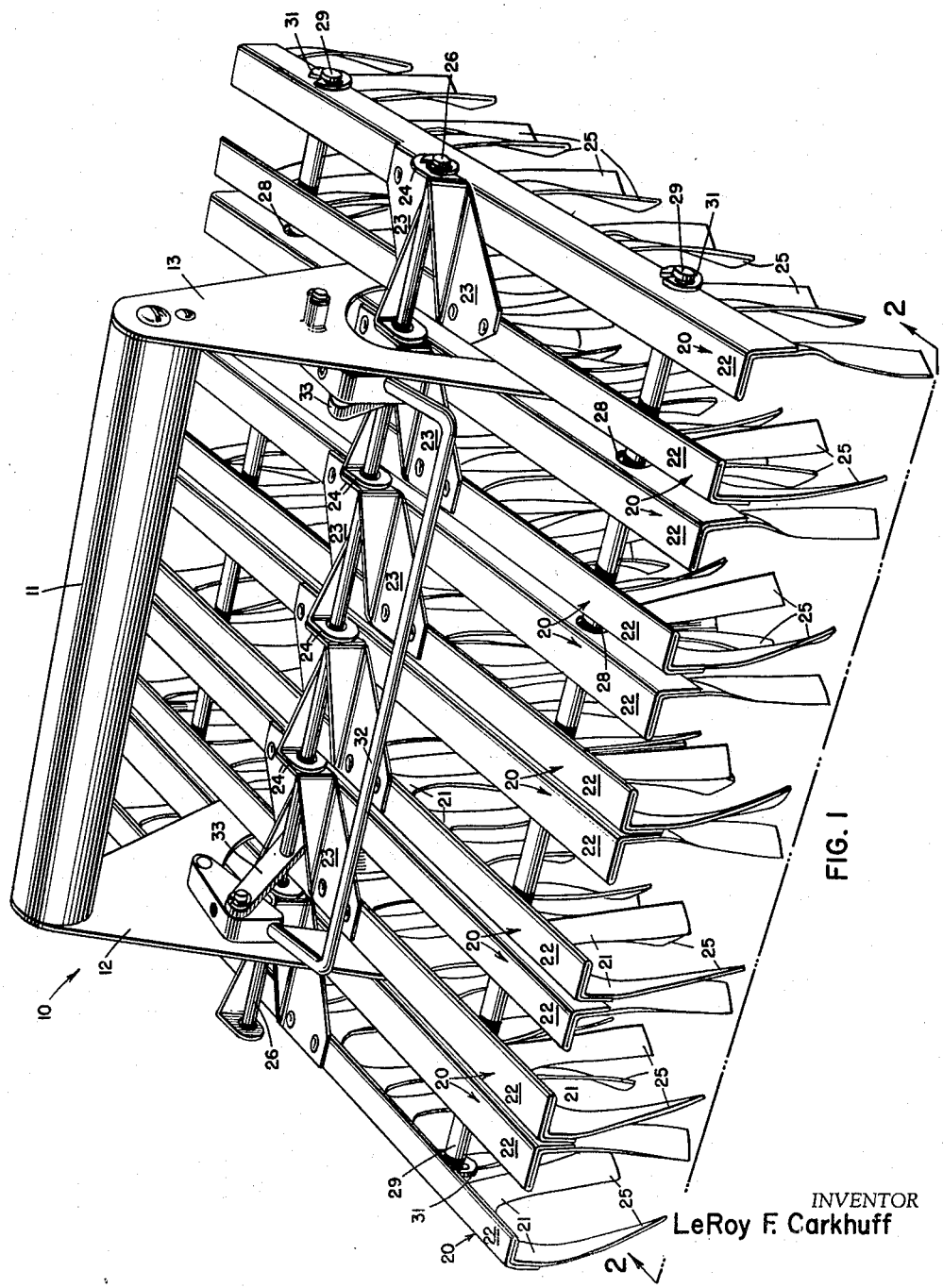
Fig. 1 is a perspective view of an egg transfer lifter in accordance with the present invention.

Referring now to the drawings, wherein like reference numerals are used to designate like or corresponding parts throughout the several views, there is shown in Fig. 1 an egg transfer lifter 10 having a handle 11 extending between and secured to a pair of spaced, parallel and aligned handle brackets 12 and 13. There may also be seen in Fig. 1 six pairs of finger blades 20.

Figure 3:
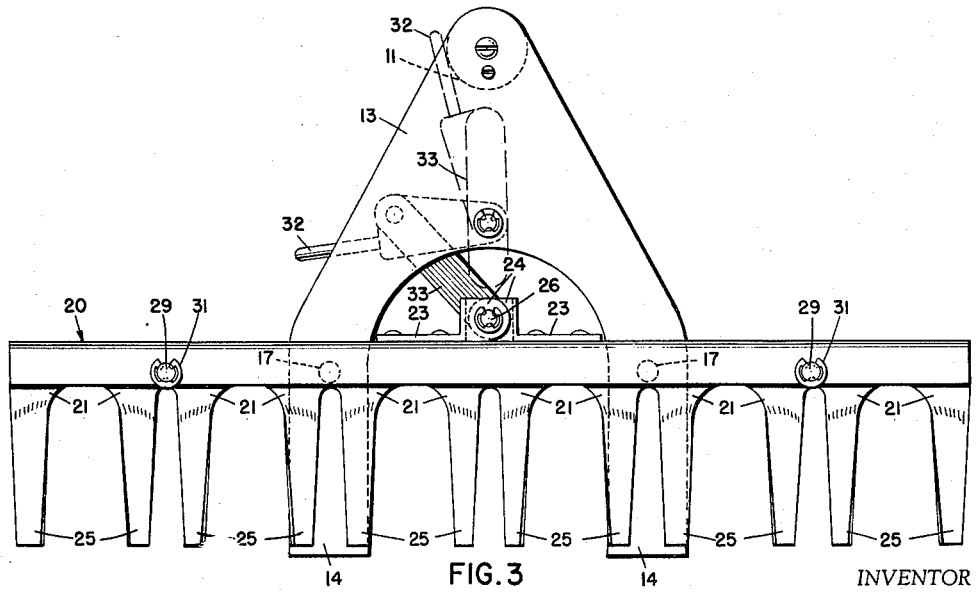
Fig. 3 is an end view of the egg lifter of the present invention, taken on the line 3—3 of Fig. 2.

As is best seen in Fig. 3, each of the finger blades 20 has six pairs of egg-engaging fingers 21 depending therefrom. The fingers 21 of each pair are twisted in opposite directions, and lie in planes that are substantially tangent to a circle. This circle is one of the circles of an egg when considered in transverse cross-section, and the center of the circle of the egg lies between the blades 20 of a pair. As may be seen from Fig. 1, the several pairs of blades are adjacent each other. Each of the fingers 21 is of spring steel and has a friction coating 25 thereon, at least at the lower part thereof.

Figure 2:
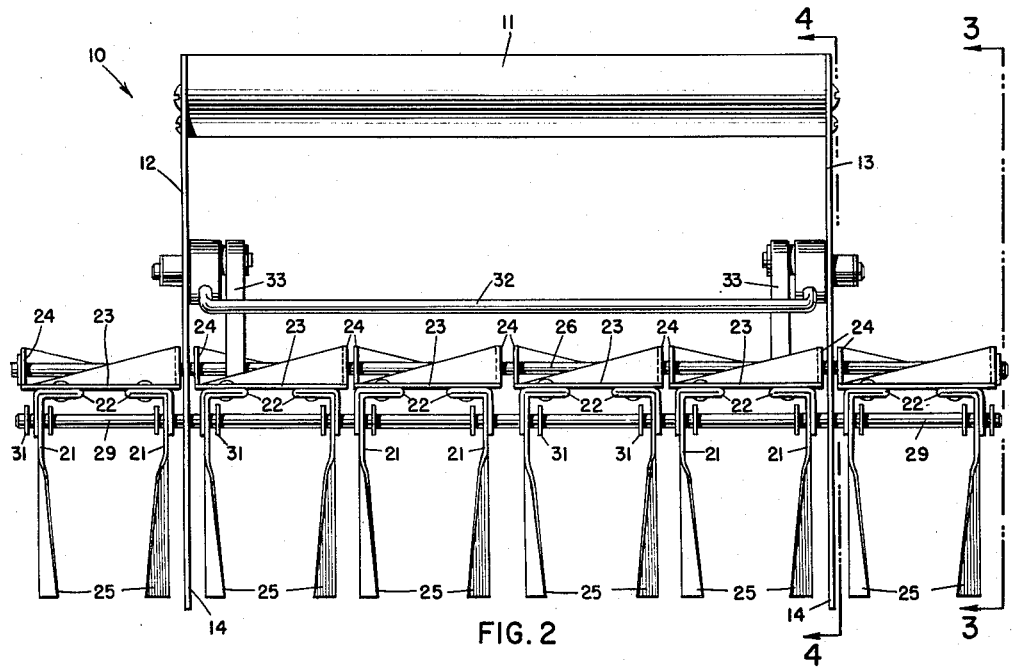
Fig. 2 is a side view of the egg transfer lifter of Fig. 1, taken along the line 2—2 of Fig. 1.

Referring now to Fig. 2, it may be seen that each of the blades 20 has a flange 22 at the top thereof, and that the flanges of a pair of finger blades 20 extend toward each other. Hence, each flange 22 extends towards the other blade 20 of a pair of blades. To each flange 22 there is secured, by rivets or the like, an arm 23 that extends towards the other blade 20 of a pair of blades. The arm 23 has an upstanding, apertured lug 24. The apertures of the lugs 24 are aligned, and a blade actuating rod 26 (see also Fig. 1) extends through the apertures of the lugs 24.

As is best seen in Fig. 4, the handle brackets (handle bracket 13 is shown therein) are of a generally inverted V configuration, and each has a pair of downwardly extending legs 14. These legs 14 may be seen to extend to a level slightly below the bottom of the fingers 21.

Each of the handle brackets 12 and 13 lies between adjacent pairs of blades, as is clearly shown in Figs. 1 and 2, and each of the legs 14 of the handle brackets 12 and 13 has an aperture 16 therethrough. A peg 17 (see Fig. 5) extends through the aperture 16, and also through apertures 27 in the blades 20. The pegs 17 have peripherally extending grooves adjacent their ends and in these grooves are positioned retaining washers 18. As is clearly shown in Fig. 5, the distance between the retaining washers 18 is considerably greater than the combined thicknesses of the blades 20 and the bracket 13; thus, these parts have room for movement relative to each other, and because the peg 17 is smaller than the apertures 27, the blades 20 may have swinging movement angularly relative to the longitudinal axis of pegs 17.

Each of the blades 20 has a pair of spaced holes 28 therein, as may be seen in Fig. 4, and through the aligned holes 28 of the several blades 20 there passes a pair of spaced, parallel support rods 29. The support rods 29 are of somewhat smaller diameter than the holes 28 through which they extend, and the support rods 29 have, as may be seen in Fig. 2, a groove adjacent but spaced from each of the blades 20. Further, as may be seen in Fig. 2, each of the grooves has a retaining washer 31 therein. Thus, there is a groove on either side of, and spaced from, the end blades 20, and a groove on either side of, and spaced from the intermediate blades 20 that are adjacent to each other.

A bail 32 is pivotally connected to the handle brackets 12 and 13, as may be seen in Figs. 1 and 2, and a pair of links 33 are pivotally connected to the arms of the bail 32 at points spaced from the pivotal axis thereof. The links 33 each have an aperture therein that receives the actuating rod 26 therethrough.

The operation of the egg transfer lifter of the present invention may best be understood from Figs. 6 and 7 of the drawing. In Fig. 6, the egg transfer lifter is in the releasing position, and it may be seen that the bail 32 is in a relatively low position, above the flanges 22. These flanges 22, and the arms 23 are substantially horizontal, and the blade actuating rod 26 is also to be seen in a low position thereof. To pick up a plurality of eggs with the lifter 10, the bail 32 is raised, as by engagement with a thumb, and is moved to the position shown in Fig. 7. This movement of bail 32, through the agency of the link 33 causes the blade actuating rod 26 to be lifted. This action will in turn cause the lifting of the apertured lugs 24, and this will in turn cause the blade 20 to pivot on the pegs 17 and the support rods 29. It will be understood, of course, that the apertures in the lugs 24 are larger in diameter than the blade actuating rod 26, and that the apertures in the blade 20 are larger in diameter than the pegs 17 and the support rods 29. The pivoting movement of the blade 20 will cause the lower ends of fingers 21 to swing inwardly and to grasp or engage with the eggs. Each egg will be supported by four of the fingers 21.

Because of the friction coating 25 on the fingers 21, eggs that are wet and slippery will be firmly held by the four fingers 21 that engage with each of the eggs. Because of the fact that the fingers 21 are of spring steel, they exert only a relatively small amount of pressure upon the eggs, and thus they yield as the blades 20 rotate upon the lifting of the bail 32 and upon engagement with an egg. This yielding action prevents an excessive pressure against an egg sufficient to crack the egg, but at the same time permits the picking up of a wide range of sizes of eggs.

To release the eggs held in an egg lifter 10, it is only necessary to release the bail 32, and the spring action of the fingers 21 will cause the blades 20 to pivot and to thus open, returning the bail 32 to the position shown in Fig. 6.

There has been provided an egg lifter having substantially no supporting frame, so that the weight thereof has been kept at a minimum. In addition, the actuating mechanism may be moved quickly to or from the egg engaging position, and the four opposed spring fingers 21 that tangentially engage with each egg provide a very positive engagement of the egg. The spring fingers and friction material insure an egg lifter in which the eggs are securely held, even when wet, but are not subjected to egg-breaking pressures and forces. It will therefore be understood that there has been provided a greatly improved and simplified egg lifter.

It will be obvious to those skilled in the art that various changes may be made without departing from the spirit of the invention and therefore the invention is not limited to what is shown in the drawings and described in the specification but only as indicated in the appended claims.

What is claimed is:

1. An egg lifter comprising a plurality of pairs of elongated finger blades, the longitudinal axis of the blades of each pair being in spaced substantially parallel and coplanar relationship, each blade having a plurality of pairs of egg-engaging spring fingers depending therefrom, the fingers of each pair being twisted in opposite directions and lying in planes substantially tangent to a circle having its center between the blades of a pair of blades, a friction material on said fingers, said pairs of blades being adjacent each other, said blades each having a pair of laterally spaced holes therein, a pair of spaced, parallel support rods extending through the holes of said finger blades and being of smaller diameter than the diameter of said holes, an arm secured to each blade, each arm extending toward the other blade of a pair of blades and having an upstanding apertured lug, said lug apertures being aligned, a blade actuating rod extending loosely through said lug apertures, a pair of spaced parallel aligned handle brackets each extending between adjacent pairs of blades, a handle extending between and secured to said handle brackets, means for loosely securing said handle brackets to some of said blades, and means in juxtaposition with said handle for elevating said actuating rod.

2. An egg lifter comprising a plurality of pairs of elongated finger blades, the longitudinal axis of the blades of each pair being in spaced substantially parallel and coplanar relationship, each blade having a plurality of pairs of egg-engaging spring fingers depending therefrom, the fingers of each pair being twisted in opposite directions and lying in planes substantially tangent to a circle having its center between the blades of a pair of blades, said blades each having a pair of laterally spaced holes therein, a pair of spaced, parallel support rods extending through the holes of said finger blades and being of smaller diameter than the diameter of said holes, an arm secured to each blade and extending toward the other blade of a pair of blades, means connected with the outer ends of said arms for pivoting said blades on said support rods, a pair of spaced parallel aligned handle brackets, each of a generally inverted V configuration, and each extending between adjacent pairs of blades, a handle extending between and secured to said handle brackets, an aperture in each leg of said handle brackets, and a peg supported in each of said handle bracket apertures and extending on opposite sides of each of said handle brackets, each finger blade adjacent a handle having a pair of spaced apertures therein receiving the pegs of the adjacent handle bracket therethrough.

3. An egg lifter comprising a plurality of pairs of elongated finger blades, the longitudinal axis of the blades of each pair being in spaced substantially parallel and coplanar relationship, each blade having a plurality of pairs of egg-engaging spring fingers depending therefrom, laterally spaced support rods extending loosely through said blades and supporting said pairs of blades adjacent each other and including a portion laterally offset and above said longitudinal axis, an arm secured to each blade, means connected with said laterally offset portion of said arms for pivoting said blades on said support rods, a handle overlying at least some of said blades, and means for securing said handle to some of said blades.

4. An egg lifter comprising a plurality of pairs of elongated finger blades, the longitudinal axis of the blades of each pair being in spaced substantially parallel and coplanar relationship, each blade having a plurality of pairs of egg-engaging fingers depending therefrom, the fingers of each pair being twisted in opposite directions and lying in planes substantially tangent to a circle having its center between the blades of a pair of blades, said pairs of blades being adjacent each other, an arm secured to each blade and including a portion laterally offset and above said longitudinal axis, a handle overlying at least some of said blades, means for securing said handle to at least some of said blades, said blades each having a pair of laterally spaced holes therein, a pair of spaced, parallel support rods extending through the holes of said finger blades and being of smaller diameter than the diameter of said holes, and means connected to said laterally offset blade portions for pivoting said blades on said support rods.

5. An egg lifter comprising a plurality of pairs of elongated finger blades, the longitudinal axis of the blades of each pair being in spaced substantially parallel and coplanar relationship, each blade having a plurality of pairs of egg-engaging spring fingers depending therefrom, the fingers of each pair being twisted in opposite directions and lying in planes substantially tangent to a circle having its center between the blades of a pair of blades, laterally spaced support rods extending loosely through said blades and supporting said pairs of blades adjacent each other, an arm secured to each blade and including a portion laterally offset and above the longitudinal axis thereof, means connected to said offset portion of said arms for pivoting said blades on said support rods, a pair of spaced parallel aligned handle brackets each extending between adjacent pairs of blades, a handle extending between and secured to said handle brackets, and means for loosely securing said handle brackets to some of said blades.

6. An egg lifter comprising a plurality of pairs of elongated finger blades, the longitudinal axis of the blades of each pair being in spaced substantially parallel and coplanar relationship, each blade having a plurality of pairs of egg-engaging spring fingers depending therefrom, the fingers of each pair being twisted in opposite directions and lying in planes substantially tangent to a circle having its center between the blades of a pair of blades, said pairs of blades being adjacent each other, an arm secured to each blade, each arm extending toward the other blade of a pair of blades and having an upstanding apertured lug laterally offset and above said longitudinal axis, said lug apertures being aligned, a blade actuating rod extending loosely through said lug apertures, a handle overlying at least some of said blades, means for securing said handle to at least some of said blades, said blades each having a pair of laterally spaced holes therein, a pair of spaced, parallel support rods extending through the holes of said finger blades and being of smaller diameter than the diameter of said holes, a bail pivotally connected to said handle brackets, a pair of spaced links pivotally connected to said spaced bail at points spaced from the pivotal axis thereof, said links each having an aperture therein, and receiving said actuating rod therethrough.

References Cited in the file of this patent

UNITED STATES PATENTS

| 505,429 | Alderson | Sept. 26, 1893 |
| 879,801 | Swanson | Feb. 18, 1908 |
| 944,214 | Rydquist | Dec. 21, 1909 |
| 962,362 | Lang | June 21, 1910 |
| 1,224,373 | Goble | May 21, 1917 |